US008848534B2

(12) United States Patent
Yang et al.

(10) Patent No.: US 8,848,534 B2
(45) Date of Patent: Sep. 30, 2014

(54) DYNAMIC RESOURCE ALLOCATION WITHIN A HETEROGENEOUS WIRELESS TRANSPORT NETWORK

(75) Inventors: Jin Yang, Orinda, CA (US); Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 521 days.

(21) Appl. No.: 13/222,651

(22) Filed: Aug. 31, 2011

(65) Prior Publication Data

US 2013/0051233 A1 Feb. 28, 2013

(51) Int. Cl.
*H04L 12/26* (2006.01)
*H04W 16/10* (2009.01)
*H04W 92/20* (2009.01)

(52) U.S. Cl.
CPC ............. *H04W 16/10* (2013.01); *H04W 92/20* (2013.01)
USPC ........................................ 370/235; 370/230

(58) Field of Classification Search
CPC ................................................. H04W 22/0131
USPC ........................................................ 370/235
See application file for complete search history.

(56) References Cited

U.S. PATENT DOCUMENTS

2005/0190701 A1* 9/2005 Bejerano et al. ............ 370/252
2008/0084819 A1* 4/2008 Parizhsky et al. ........... 370/230
2010/0202311 A1* 8/2010 Lunttila et al. .............. 370/252

OTHER PUBLICATIONS

Tian Bu et al., "Generalized Proportional Fair Scheduling in Third Generation Wireless Data Networks", IEEE INFORCOM 2006, p. 1-12.

* cited by examiner

*Primary Examiner* — Afshawn Towfighi

(57) ABSTRACT

A system to receive an instruction to allocate resources to a particular link of a group of links, to permit traffic to be transmitted to one of a group of nodes, associated with one of a group of base stations, via the particular link; and identify a respective achievable throughput, associated with each link during a first time period, based on a respective capacity and condition associated with each link. The system is also to identify a respective achieved throughput, associated with each link, based on a respective achieved throughput associated with each link during a second time period and a respective quantity of traffic to be transmitted via each link during the first time period; generate a respective value, associated with each link, based on the respective achievable throughput and the respective achieved throughput; and transmit, to a node and via a link, a quantity of traffic, based on a determination that a respective value, associated with the link, is a greatest respective value.

22 Claims, 6 Drawing Sheets

| LINK ID 405 | TRANSPORT NODE ID 410 | LINK CAPACITY 415 | FREQUENCY BAND 420 | BANDWIDTH 425 | SIGNAL STRENGTH 430 | UD QUANTITY 435 | CONDITION 440 |
|---|---|---|---|---|---|---|---|
| 220-1 | 230-1 | CAP1 | BAND 1 | BW1 | PWR1 | QTY1 | CONGESTION |
| 220-2 | 230-2 | CAP2 | BAND 2 | BW2 | PWR2 | QTY2 | FADE |
| 220-3 | 230-3 | CAP3 | BAND 1 | BW3 | PWR3 | QTY3 | DROPPED PACKETS |

| LINK ID 505 | AVAILABLE TRAFFIC 510 | ACHIEVABLE THROUGHPUT 515 | ACHIEVED THROUGHPUT 520 | PRIORITY 525 |
|---|---|---|---|---|
| 220-1 | TRAF1 | TA1 | PT1 | P1 |
| 220-2 | TRAF2 | TA2 | PT2 | P2 |
| 220-3 | TRAF3 | TA3 | PT3 | P3 |
| ... | | ... | | |

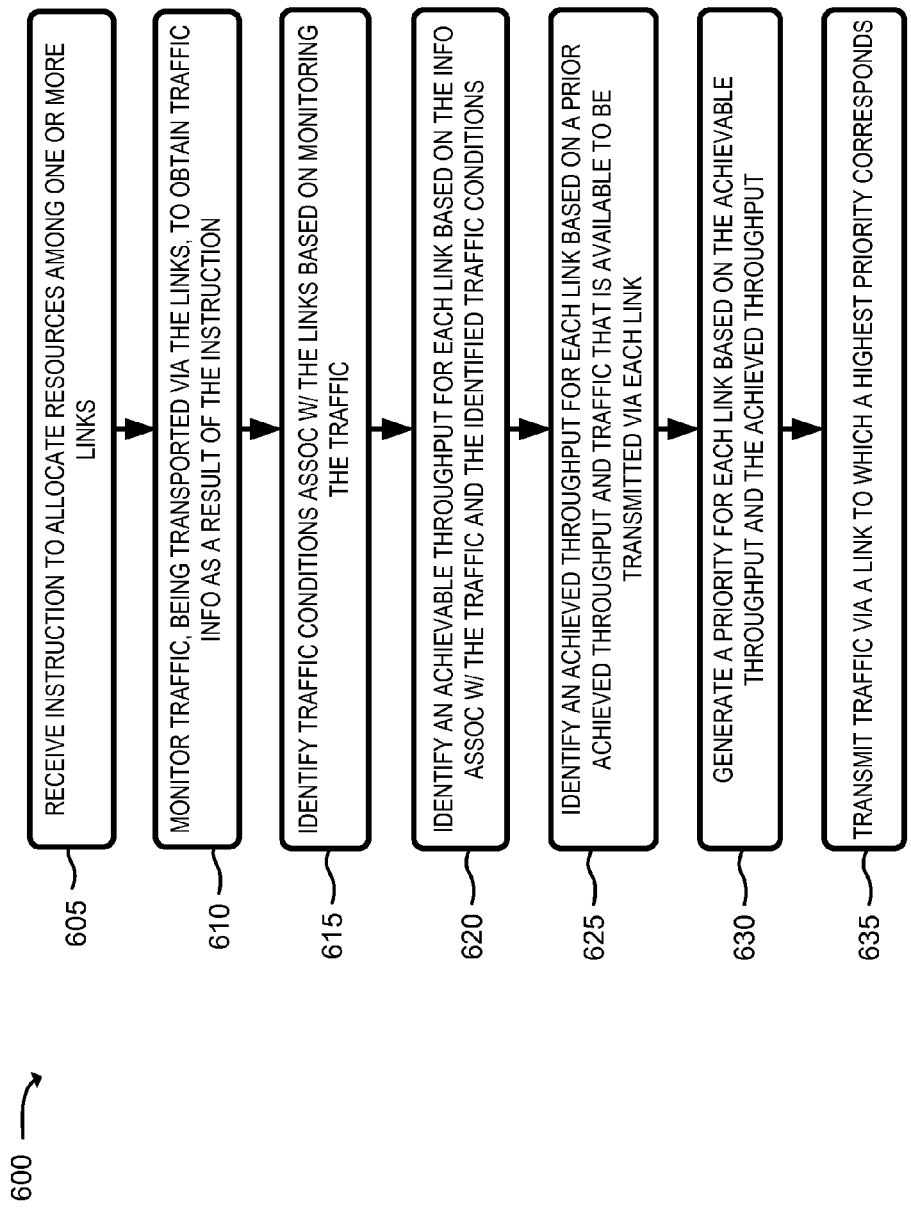

DYNAMIC RESOURCE ALLOCATION WITHIN A HETEROGENEOUS WIRELESS TRANSPORT NETWORK

BACKGROUND

Evolved Packet System (EPS) is a network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session. The EPS is capable of processing various types of traffic (e.g., video, voice, text, etc.) at higher throughput and/or bandwidth than previous generation architectures (e.g., pre-3GPP networks).

Base stations, within the LTE network, may be connected via links associated with a wireless transport network (sometimes referred to as a "backhaul network") associated with the LTE network. The links may also connect the base stations to the EPC, which enables the base stations to send traffic to and/or receive traffic from the EPC. However, resources associated with backhaul links (e.g., such as bandwidth, frequency and/or time allocations, power levels, etc.) are usually managed on a per-link basis. Managing the resources on a per-link basis may cause some links to become over-utilized (e.g., which may result in link congestion) and/or other links to be under-utilized (e.g., which may result in wasteful use of network assets).

BRIEF DESCRIPTION OF THE DRAWINGS

FIG. 4 is a diagram of an example data structure for storing traffic information associated with links within the LTE network;

FIG. 5 is a diagram of an example data structure for storing link analysis information associated with the links within the LTE network; and FIG. 6 is a flowchart of an example process for prioritizing links and/or allocating resources, to the links, based the prioritization of the links according to an implementation described herein.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a point-multipoint (PMP) node, associated with a base station (e.g., a macro base station associated with a macro cell), to transmit backhaul traffic to and/or from a transport node associated with a micro base stations (e.g., associated with micro cells). The traffic may be transmitted via network paths (hereinafter referred to as "links"), within a backhaul network associated with a radio access network (RAN), connecting the PMP node and the transport node. The system and/or method may allow the PMP node to identify traffic conditions associated with each of the links. The system and/or method may allow the PMP node to identify an achievable throughput, for each of the links, that corresponds to a quantity of traffic that can be transmitted, via each of the links and within a period of time, based on the traffic conditions and/or a capacity associated with each of the links.

The system and/or method may allow the PMP node to identify an achieved throughput that identifies a quantity of throughput, associated with each of the links, during a previous period of time. The system and/or method may allow the PMP node to assign a different priority to each of the links based on the achievable throughput and the achieved throughput for each of the links. The system and/or method may allow the PMP node to allocate resources to the link that has been assigned the highest priority of the priorities assigned to the links. The system and/or method may allow the PMP node to transmit traffic via the link that has been assigned the highest priority.

Figure 1:
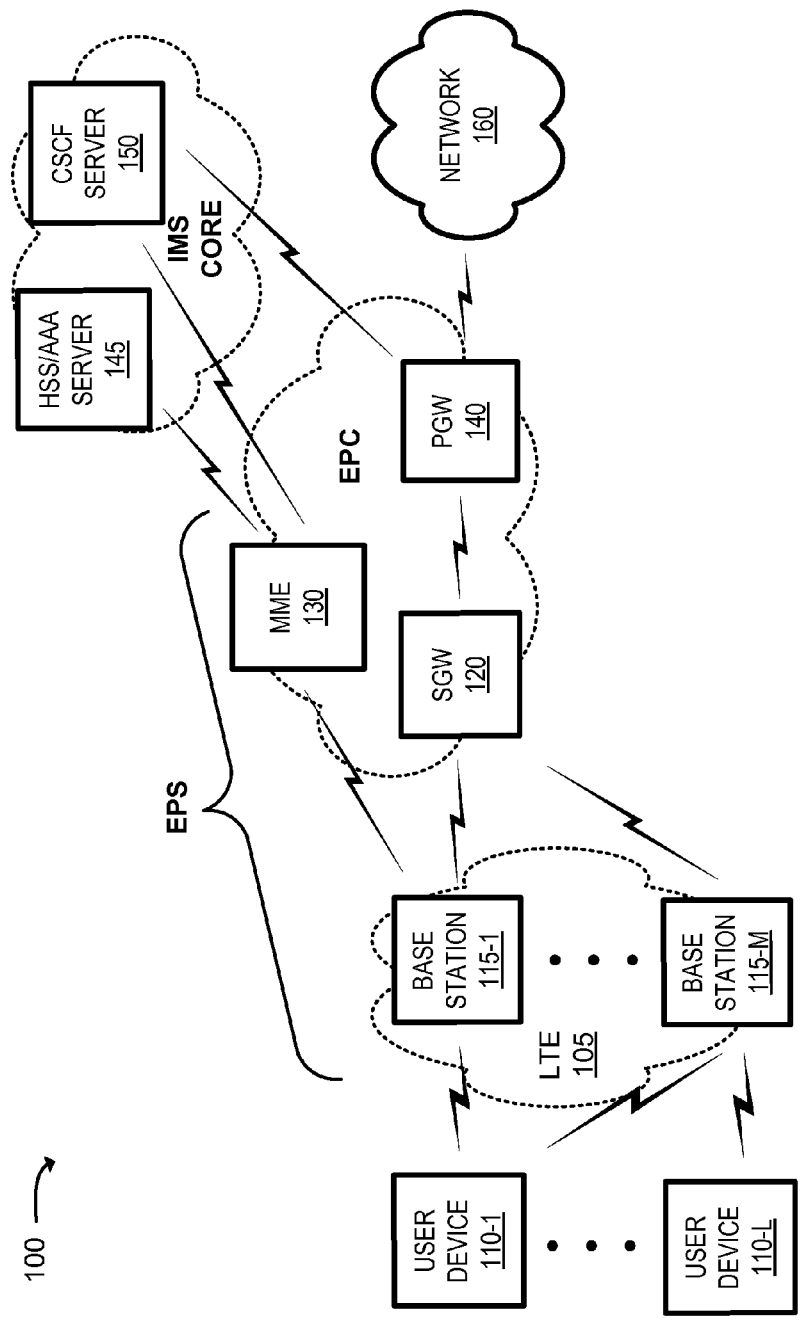
FIG. 1 is a diagram of an example environment in which systems and/or methods described herein may be implemented.

FIG. 1 is a diagram of an example environment 100 in which a system and/or method described herein may be implemented. As shown in FIG. 1, environment 100 may include a group of users devices 110-1, . . . , 110-L (where L≥1) (hereinafter referred to collectively as "user devices 110" and individually as "user device 110"), a group of base stations 115-1, . . . , 115-M (where M≥1) (hereinafter referred to collectively as "base stations 115" and individually as "base station 115"), a serving gateway 120 (hereinafter referred to as "SGW 120"), a mobility management entity device 130 (hereinafter referred to as "MME 130"), a packet data network (PDN) gateway (PGW) 140, a home subscriber server (HSS)/authentication, authorization, accounting (AAA) server 145 (hereinafter referred to as an "HSS/AAA server 145"), a call session control function (CSCF) server 150 (hereinafter referred to as "CSCF server 150"), and a network 160. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 100 may include an evolved packet system (EPS) that includes a LTE network 105 and/or an evolved packet core (EPC) that operate based on a third generation partnership project (3GPP) wireless communication standard. LTE 105 may be a RAN that includes one or more base stations 115 that take the form of evolved Node Bs (eNBs) via which user devices 110 communicate with the EPC. The EPC may include SGW 120, MME 130, and/or PGW 140 that enable user devices 110 to communicate with network 160 and/or an Internet protocol (IP) multimedia subsystem (IMS) core. The IMS core may include HSS/AAA server 145 and/or CSCF server 150 and may manage authentication, session initiation, account information, profile information, etc. associated with user devices 110.

User device 110 may include any computation or communication device, such as a wireless mobile communication device that is capable of communicating with base station 115. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

Base station 115 may include one or more devices that receive, process, and/or transmit traffic, such as voice, video, text, and/or other data, destined for and/or received from user device 110. In an example implementation, base station 115 may be an eNB associated with LTE network 105 that receives traffic from and/or sends traffic to network 160 via SGW 120 and PGW 140. Base station 115 may send traffic to and/or receive traffic from user device 110 via an air interface.

Base station 115 may be a macro base station 115 that performs point-to-multipoint (PMP) communications. For example, macro base station 115 may communicate with micro base stations 115 via one or more links. Macro base station 115 may, in one example, be associated with a macro cell via which user device 110 communicates with macro base station 115. The micro base stations 115 may be associated with micro cells via which user device 110 communicates with the micro base stations 115. The micro cells may cover smaller areas than the macro cell. Macro base station 115 may perform load balancing, associated with LTE network 105, by dynamically allocating resources over the links to ensure that the links do not become congested and/or to ensure that the links are not under-utilized.

SGW 120 may include one or more computation or communication devices that gather, process, search, store, and/or provide information in a manner described herein. SGW 120 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 120 may aggregate traffic received from one or more base stations 115 associated with LTE network 105, and may send the aggregated traffic to network 160 (e.g., via PGW 140) and/or other network devices associated with the IMS core and/or the EPC. SGW 120 may also receive traffic from the other network devices and/or may send the received traffic to user device 110 via base station 115. SGW 120 may perform operations associated with handing off user device 110 from and/or to LTE network 105.

MME 130 may include one or more computation or communication devices that gather, process, search, store, and/or provide information in a manner described herein. For example, MME 130 may perform operations associated with handing off user device 110, from a first base station 115 to a second base station 115, when user device 110 is exiting a cell associated with the first base station 115. MME 130 may, in yet another example, perform an operation to handoff user device 110 from the second base station 115 to the first base station 115 when user device 110 is entering the cell associated with first base station 115.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs 120, etc. and may send the aggregated traffic to network 160. In another example implementation, PGW 140 may receive traffic from network 160 and may send the traffic toward user device 110 via SGW 120.

HSS server 145 may include one or more server devices, or other types of computation or communication devices, that gather, process, search, store, and/or provide information in a manner described herein. For example, HSS server 145 may manage, update, and/or store, in a memory associated with HSS server 145, profile information associated with user device 110 that identifies applications and/or services that are permitted for and/or accessible by user device 110, information associated with a user of user device 110 (e.g., a username, a password, a personal identification number (PIN), etc.), rate information, minutes allowed, and/or other information. Additionally, or alternatively, HSS server 145 may include a device that performs authentication, authorization, and/or accounting (AAA) operations associated with a communication session with user device 110.

CSCF server 150 may include one or more server devices, or other types of computation or communication devices, that gather, process, search, store, and/or provide information in a manner described herein. CSCF server 150 may process and/or route calls to and from user device 110 via the EPC. For example, CSCF server 150 may process calls, received from network 160, that are destined for user device 110. In another example, CSCF server 150 may process calls, received from user device 110, that are destined for network 160.

Network 160 may include one or more wired and/or wireless networks. For example, network 160 may include a cellular network, a public land mobile network (PLMN), a second generation (2G) network, a third generation (3G) network, a fourth generation (4G) network, a fifth generation (5G) network, and/or another network. Additionally, or alternatively, network 160 may include a wide area network (WAN), a metropolitan network (MAN), an ad hoc network, an intranet, the Internet, a fiber optic-based network (e.g., a FiOS network), and/or a combination of these or other types of networks.

Figure 2:
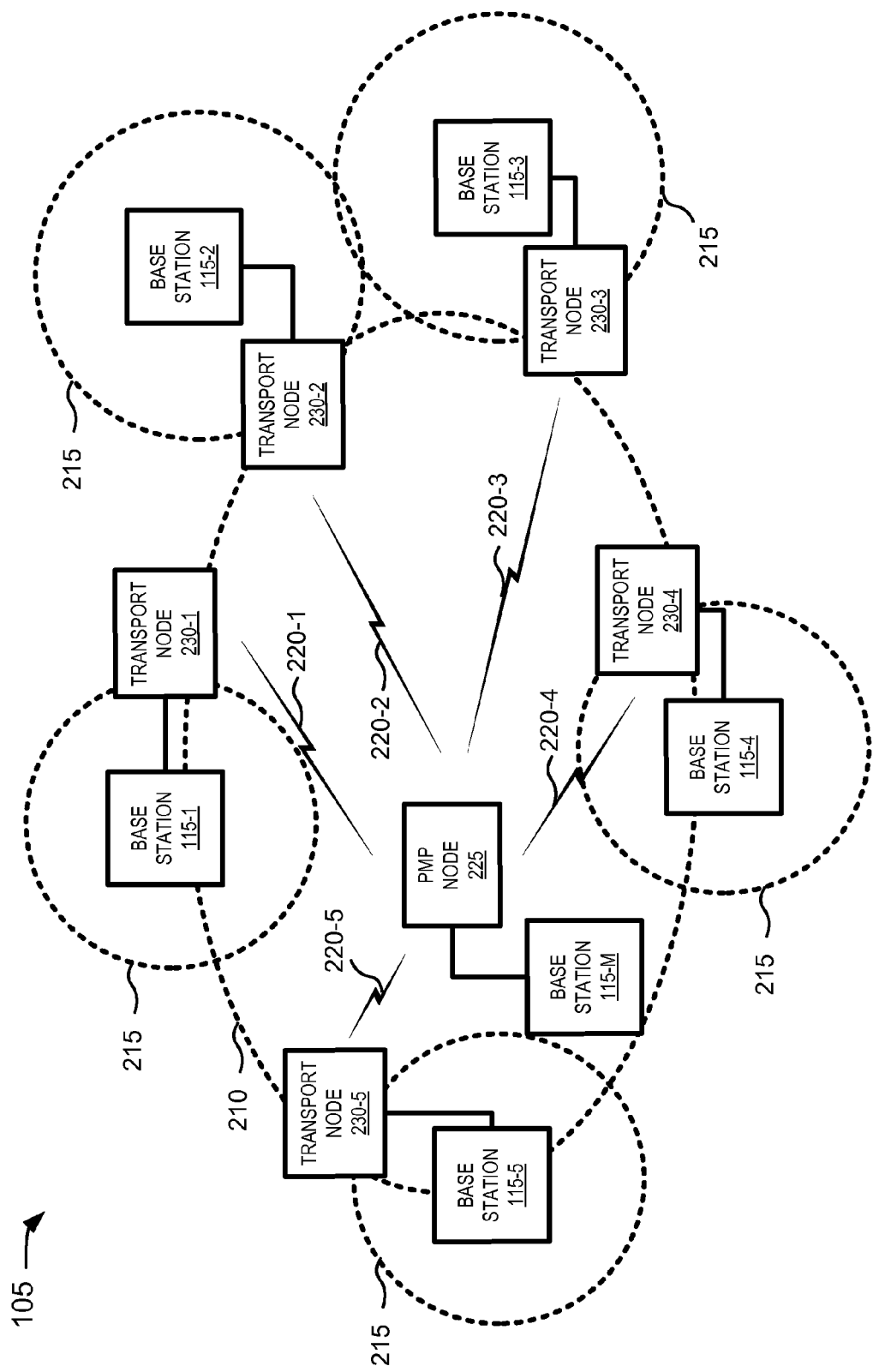
FIG. 2 is a diagram of a long term evolution (LTE) network within the environment of FIG. 1.

FIG. 2 is a diagram of interconnections between one or more devices within LTE network 105. As shown in FIG. 2, LTE network 105 may include a macro base station 115-M and/or micro base stations 115, as well as a macro cell 210, micro cells 215, a group of links 220-1, . . . 220-5 (hereinafter referred to collectively as "links 220" and individually as "link 220"), a point-to-multipoint (PMP) node 225 and a group of base station transport nodes 230-1, . . . , 230-5 (hereinafter referred to collectively as "transport nodes 230" and individually as "transport node 230"). The number of cells, links, and/or nodes, illustrated in FIG. 2, is provided for explanatory purposes only. In practice, there may be additional cells, links, and/or nodes; fewer cells, links, and/or nodes; different cells, links, and/or nodes; or differently arranged cells, links, and/or nodes than illustrated in FIG. 2.

Macro cell 210 may be associated with macro base station 115-M, which allows user device 110 to communicate via hub base station 115-M. Macro cell 210 may provide coverage over a geographical area that is not covered by micro cells 215 that enables user device 110 to continuously communicate via LTE network 105 when travelling between micro cells 215 and/or when user device 110 is not located in a coverage area associated with micro cell 215. Micro cell 215 may be associated with base station 115, which allows user device 110 to communicate via base station 115. Generally, micro cell 215 may provide coverage for another geographical area that is smaller in size than the geographical area associated with macro cell 210.

Link 220 may represent a network path between PMP node 225 and transport node 230 that allows traffic to flow between PMP node 225 and transport node 230 and/or between macro base station 115-M and micro base station 115. For example, link 220-1 may represent a network path between PMP node 225 and transport node 230-1. In another example, link 220-2 may represent a network path between PMP node 225 and transport node 230-2. While, link 220 is described below as representing a wireless connection (e.g., such as a radio frequency (RF) link), link 220 may, in other implementations, represent a wired connection or a combination of wired and wireless connections.

PMP node 225 may include one or more server devices, or other types of computation or communication devices, that gather, process, search, store, and/or provide information in a manner described herein. PMP node 225 may, in one example implementation, be connected to macro base station 115-M and/or transport node 230. PMP node 225 and/or macro base station 115-M may, in another example implementation, be integrated into a single device. For example, macro base station 115-M may perform one or more, or all, of the functions described below as being performed by PMP node 225. In another example, a network device may perform all or a portion of the functions described as being performed by PMP node 225 and/or macro base station 115-M PMP node 225 may assign respective time, frequency and/or bandwidth, and/or power resources to each link 220 that enables traffic to be transported via link 220. PMP node 225 may obtain traffic information from links 220 and/or may cause macro base station 115-M to obtain traffic information from links 220. The traffic information may identify one or more frequency bands, bandwidths, data rates, power levels, quantity of user devices 110, conditions present, etc. associated with traffic being transported, via link 220, between PMP node 225 and transport node 230, and/or between macro base station 115-M and micro base station 115. PMP node 225 may also, or alternatively, measure instantaneous radio signal strength (e.g., at a point in time) and/or may identify changes and/or fluctuations (e.g., radio fade) in signal strength over a period of time. PMP node 225 may, for example, identify the changes in signal strength as environmental conditions (e.g., weather, obstructions to radio signals, etc.) and/or network conditions change.

PMP node 225 may use the traffic information and/or information associated with a capacity of link 220 to identify an achievable throughput with respect to link 220. The achievable throughput may represent a maximum quantity of traffic (e.g., a maximum bandwidth, a maximum data rate, a maximum quantity of frames and/or packets within a time period, etc.) that can be transported, via link 220, based on conditions that exist on link 220.

PMP node 225 may retrieve, from a memory associated with PMP node 225 and/or macro base station 115-M, a previous achievable throughput associated with link 220 and/or may obtain identify a quantity of available traffic that is available to be transmitted to and/or from transport node 230 and/or base station 115. PMP node 225 may assign a different priority to each link 220 based on the achievable throughput, the previous achievable throughput, and/or the quantity of available traffic associated with each link 220. PMP node 225 may identify which link 220 is assigned the highest priority and may allocate resources to the identified link 220. Allocating the resources, to the identified link 220, may allow the available traffic to be transmitted to transport node 230 and/or base station 115 via the identified link.

Transport node 230 may include one or more server devices, or other types of computation or communication devices, that gather, process, search, store, and/or provide information in a manner described herein. Transport node 230 may, in one example implementation, be connected to micro base station 115 and/or PMP node 225. Transport node 230 and/or micro base station 115 may, in another example implementation, be integrated into a single device. For example, micro base station 115 may perform one or more, or all, of the functions described below as being performed by transport node 230. In another example, a network device may perform all or a portion of the functions described as being performed by transport node 230 and/or micro base station 115.

Transport node 230 may receive traffic from micro base station 115 and may transport the traffic to PMP node 225. Transport node 230 may, for example, communicate with micro base station 115 to obtain traffic information associated with traffic being processed by micro base station 115. Transport node 230 may also, or alternatively, monitor traffic conditions on link 220. Transport node 230 may transmit traffic information (e.g., obtained from micro base station 115 and/or associated with link 220) to PMP node 225. Transport node 230 may receive, from PMP node 225, instructions to transmit and/or receive traffic, via link 220, at a particular frequency, power level, time period, etc. Transport node 230 may, based on the instruction, transmit and/or receive the traffic, via link 220, at the particular frequency, power level, time period, etc.

Figure 3:
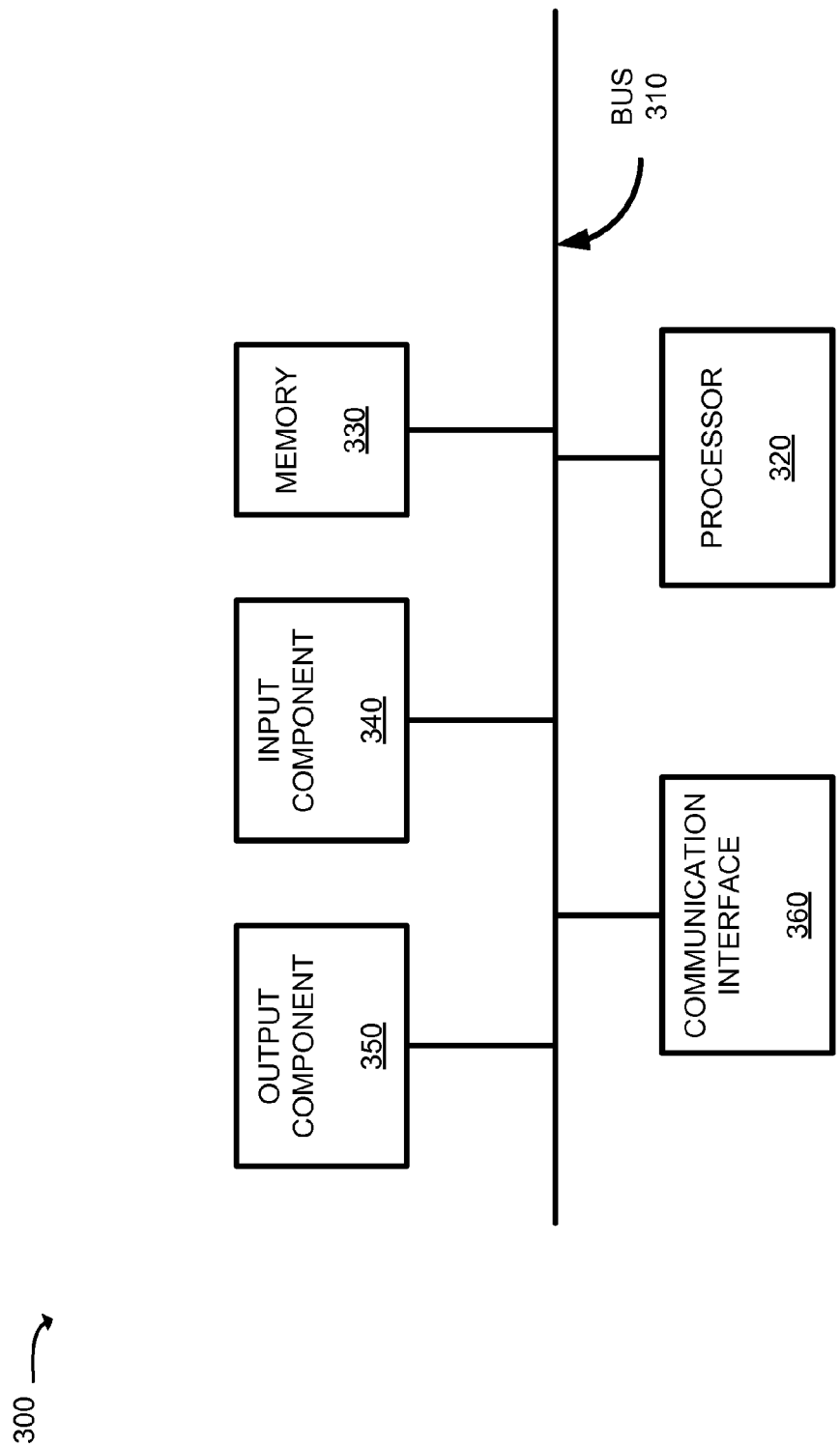
FIG. 3 is a diagram of example components of one or more of the devices of FIGS. 1 and/or 2.

FIG. 3 is a diagram of example components of a device 300. Device 300 may correspond to user device 110, SGW 120, MME 130, PGW 140, HSS server 145, CSCF server 150, PMP node 225, and/or transport node 230. Alternatively, or additionally, each of user device 110, SGW 120, MME 130, PGW 140, HSS server 145, CSCF server 150, PMP node 225, and/or transport node 230 may include one or more devices 300.

Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 160. In one alternative implementation, communication interface 360 may be a logical component that includes input and output ports, input and output systems, and/or other input and output components that facilitate the transmission of data to other devices.

As will be described in detail below, device 300 may perform certain operations relating to allocating resources within a RAN. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 for storing traffic information associated with links 220 within LTE network 105. As illustrated in FIG. 4, data structure 400 may store a collection of fields, such as a link identifier (ID) field 405, a base station ID field 410, a link capacity field 415, a frequency band field 420, a bandwidth field 425, a signal strength field 430, a user device (UD) quantity field 435, and a condition field 440. Data structure 400 includes fields 405-440 for explanatory purposes. In practice, data structure 400 may include additional fields, fewer fields, different fields, and/or differently arranged fields than are described with respect to data structure 400.

Link ID field 405 may store information that uniquely identifies a particular link (e.g., such as a link identifier, a link name, etc.) that connects PMP node 225 and base station 115. Transport node ID field 410 may store information associated with transport node 230 with which PMP node 225 is communicating via the particular link, identified in link ID field 405. Link capacity field 415 may store information that identifies a maximum quantity of traffic that can be carried, via the particular link, when no traffic conditions (e.g., congestion, jitter, dropped and/or mis-ordered packets, signal fade, etc.) are present on the particular link. The maximum quantity of traffic may be identified in one or more of a variety of ways, such as a maximum quantity of bandwidth, a maximum quantity of frequency bands, a maximum data rate, a maximum quantity of packets and/or frames within a time period, etc.

Frequency band field 420 may store information that identifies one or more frequency bands that are being used to transport traffic via the particular link. Bandwidth field 420 may store information that identifies a quantity of bandwidth being used to transport the traffic via the particular link. In one example, the quantity of bandwidth may represent an aggregate quantity of bandwidth that corresponds to the frequency bands. In another example, the quantity of bandwidth may represent bandwidth being used to transmit traffic via one or a portion of the frequency bands. Signal strength field 430 may store information that identifies a signal strength associated with signals that carry traffic via the particular link. The signal strength may correspond to a power level, a signal-to-noise ratio, etc.

UD quantity field 435 may store information that identifies a quantity of user devices 110 being served by the particular base station 110 with which the particular link is associated. Condition field 440 may store information that identifies one or more conditions that have been detected on the particular link, such as, for example, congestion, jitter, dropped and/or mis-ordered packets, etc. Condition field 440 may also, or alternatively, store information that identifies a level of severity associated with changes and/or fluctuations in radio signal strength (e.g., radio fade) due to changes in environmental conditions (e.g., weather, obstructions, etc.) and/or network conditions associated with link 220.

PMP node 225 may obtain traffic information associated with links 220. PMP node 225 may store information that identifies link 220 (e.g., 220-1) and/or transport node 230 (e.g., 230-1) to which identified link 220 corresponds (e.g., as shown by ellipse 442). PMP node 225 may retrieve, from a memory, a capacity associated with the identified link 220 and may store a value associated with the capacity (e.g., CAP1) (e.g., as shown by ellipse 442). PMP node 225 may store information associated with one or more frequency bands (e.g., band 1), a quantity of bandwidth (e.g., BW1), and/or a quantity of power (e.g., PWR 1) being used to transport traffic via the identified link 220 (e.g., as shown by ellipse 442). PMP node 225 may store a quantity of user devices 110 (e.g., QTY 1) being served via link 220 and/or by the identified base station 115 and/or information associated with a condition (e.g., congestion) that was detected, by PMP node 225, on the identified link 220 (e.g., as shown by ellipse 442). PMP node 225 may store other traffic information, associated with other links 220 via which PMP node 225 is communicating, in data structure 400 (e.g., as shown by ellipses 444 and 446).

FIG. 5 is a diagram of an example data structure 500 for storing link analysis information, associated with links 220, within LTE network 105. As illustrated in FIG. 5, data structure 500 may store a collection of fields, such as a link identifier (ID) field 505, an available traffic field 510, an achievable throughput field 515, an achieved throughput field 520, and a priority field 525. Data structure 500 includes fields 505-525 for explanatory purposes. In practice, data structure 500 may include additional fields, fewer fields, different fields, and/or differently arranged fields than are described with respect to data structure 500.

Link ID field 505 may store information that uniquely identifies a particular link 220 (e.g., such as a link identifier, a link name, etc.) that connects PMP node 225 and a particular base station 115. Available traffic field 510 may store information that identifies a quantity of traffic that is available to be transmitted to and/or from the particular base station 115, via the particular link 220, within a period of time. The quantity of traffic may, for example, correspond to a measure of traffic, such as a quantity of packets, a quantity of frames, a quantity of bytes, etc.

Achievable throughput field 515 may store a value, associated with an achievable throughput (e.g., $AT_T$ where AT represents the achievable throughput, and where T is a current period of time). The achievable throughput may be based on a quantity of traffic that can be transported, via the particular link 220 and within the current period of time, based on a maximum capacity of link 220 and/or a condition that exists on link 220. For example, for a given amount of maximum capacity of link 220, a quantity of achievable throughput may increase when a level of severity, associated with a condition on link 220, decreases. In other words, an achievable throughput, associated with link 220, may be maximized when no conditions (e.g., such as congestion, signal fade, etc.) are present on link 220. However, when congestion is present, the quantity of achievable throughput, associated with link 220, may be degraded.

Achieved throughput field 520 may store a value associated with an achieved throughput (e.g., $AT'_T$, where AT' represents the achieved throughput). The achieved throughput may be based on an achieved throughput from a previous time period (e.g., $PT_{T-1}$ where PT represents the previous achieved throughput and T−1 represents the previous time period) and the quantity of available traffic, identified in available traffic field 510, relative to the current time period (e.g., $TX_T$, where TX represent the available traffic). In one example, the achieved throughput may be an average of the previous achieved throughput and the available traffic (e.g., $AT'_T \cong (PT_{(T-1)} + TX_T)/2$).

In another example, the achieved throughput may be a weighted average of the previous achieved throughput and the available traffic (e.g., $AT'_T \cong (1-\alpha)*PT_{(T-1)} + \alpha*TX_T$, where α represents a weighting factor, such that $0 \le \alpha \le 1$). The weighting factor may be predetermined by macro base station 115-M and/or PMP node 225 and/or may be specified by a network manager associated with environment 100. The weighting factor may, in one example, be set such that the achieved throughput is based on the available traffic (e.g., when $\alpha \cong 0$). In another example, the weighting factor may be set such that the achieved throughput is based on the previous achieved throughput (e.g., when $\alpha \cong 1$). In yet another example, the weighting factor may be set such that the achieved throughput is based on the available traffic and the previous achieved throughput (e.g., when $\alpha > 0$ and $\alpha < 1$).

Priority field 525 may store a value that corresponds to a priority associated with the particular link 220. The priority (e.g., $P_T$, where P represents a priority associated with the particular link 220) may be based on the achievable throughput and the achieved throughput (e.g., $P_T \cong (AT_T/AT'_T)$). For example, when a quantity of achieved throughput, associated with link 220 decreases, the value that corresponds to the priority may increase. In another example, when the quantity of achieved throughput increases, the value that corresponds to the priority may decrease.

PMP node 225 may store link analysis information, associated with link 220, in data structure 500. PMP node 225 may, for example, monitor traffic being transmitted via link 220 and may store, in data structure 500, information associated with link 220 (e.g., 220-1) and/or a value associated with a quantity of traffic that is available to be transmitted to base station 115, via link 220 (e.g., TRAF1) (e.g., as shown by ellipse 527).

PMP node 225 may identify whether a condition (e.g., congestion, dropped and/or mis-ordered packets, jitter, signal fade, etc.) is present on link 220. If a condition, associated with link 220, is identified, PMP node 225 may determine a level of severity associated with the identified condition (e.g., a quantity of delay associated with congestion, a quantity of dropped and/or mis-ordered packets, a quantity of signal fade, etc.). PMP node 225 may retrieve, from a memory associated with PMP node 225, information associated with a traffic capacity of link 220. PMP node 225 may identify a quantity of available throughput, associated with link 220, based a level of severity associated with a condition and/or the information associated with the traffic capacity and may store, in data structure 500, a value associated with the achievable throughput (e.g., TA1, as shown by ellipse 527).

PMP node 225 may retrieve, from the memory, a value associated with a previous achieved throughput that corresponds to link 220. PMP node 225 may identify a quantity of achieved throughput, associated with link 220, based on the value associated with the previous achieved throughput and the quantity of traffic that is available to be transmitted as identified in available traffic field 510. PMP node 225 may store, in data structure 500, a value associated with the achieved throughput (e.g., PT1, as shown in ellipse 527).

PMP node 225 may generate a priority value, associated with link 220, based on the value associated with the achievable throughput (e.g., as identified in achievable throughput field 515) and the value associated with the achieved throughput, associated with link 220 (e.g., as identified in achieved throughput field 520). PMP node 225 may store the priority value (e.g., P1) in data structure 500 (e.g., as shown by ellipse 527). PMP node 225 may, in a manner similar to that described above, store other link analysis information, associated with other links 220, in data structure 500 (e.g., as shown by ellipses 529 and 531).

FIG. 6 is a flowchart of an example process 600 for prioritizing links and/or allocating resources, to the links, based the prioritization of the links, according to an implementation described herein. In one example implementation, process 600 may be performed by PMP node 225. In another example implementation, some or all of process 600 may be performed by a device or collection of devices separate from, or in combination with PMP node 225. For example, processor 600 could be performed by a network device that is a combination of macro base station 115-M and PMP node 225.

As shown in FIG. 6, process 600 may include receiving an instruction to allocate resources among one or more links (block 605). For example, PMP node 225 may receive an instruction to allocate resources, such as bandwidth, frequency bands, time slots, power levels, etc., among one or more links 220 (e.g., link 220-1, 220-2, etc.) between PMP node 225 and micro base stations 115 (e.g., base stations 115-1, 115-2, etc.). The instruction may be received based on a predetermined time interval (e.g., every 10 milliseconds (ms), 100 ms, 1 second, 10 seconds, etc.) and/or upon an occurrence of some event (e.g., detection of congestion within a link, an instruction from a network manager, etc.). The instruction may be received from a network manager and/or from PMP node 225 based on preprogrammed software and/or logic associated with PMP node 225.

As also shown in FIG. 6, process 600 may include monitoring traffic, being transported via the links, to obtain traffic information as a result of the instruction (block 610) and identifying traffic conditions, associated with the links, based on monitoring the traffic (block 615). For example, PMP node 225 may instruct macro base station 115 to monitor traffic being transported via links 220. Macro base station 115 may receive the instruction and may monitor the traffic being transported via links 220 to obtain respective traffic information associated with each of links 220 (e.g., such as traffic information that is stored in data structure 400 of FIG. 4). The traffic information, associated with link 220, may identify link 220 and/or transport node 230 from which the traffic information is obtained, one or more frequency bands and/or a quantity of signal strength (e.g., a power level, a signal-to-noise ratio, etc.) used to transport the traffic, a data rate and/or quantity of bandwidth associated with the traffic, and/or a quantity of user devices 110 with which the traffic is associated.

PMP node 225 may determine whether a condition is associated with the link 220 based on the traffic monitoring. For example, PMP node 225 may determine whether a quantity of delayed packets, associated with the traffic, is greater than a threshold. In another example, PMP node 225 may determine whether a quantity of dropped packets and/or mis-ordered packets is greater than a threshold. In yet another example, PMP node 225 may determine whether a quantity of user devices 110 communicating via link 220 is greater than a threshold. In still another example, PMP node 225 may determine whether jitter is detected on link 220. PMP node 225 may determine that a condition exists, with respect to link 220, when the quantity of delayed packets is greater than the threshold, when the quantity of dropped and/or mis-ordered packets is greater than the other threshold, when jitter has been detected, etc.

As further shown in FIG. 6, process 600 may include identifying an achievable throughput for each link based on the traffic information and/or the identified traffic conditions (block 620). For example, PMP node 225 may retrieve, from a memory associated with PMP node 225, information associated with a capacity associated with link 220. The information associated with the capacity may identify a maximum throughput (e.g., a maximum data rate, bandwidth, etc.) that can be transported, via link 220. PMP node 225 may, in a manner similar to that described above with respect to FIG. 5, determine a quantity of available throughput (e.g., $AT_T$), associated with link 220, based on a level of severity of a condition associated with link 220 and/or the capacity associated with link 220. For example, the maximum throughput may be approximately equal to the capacity when no condition is associated with link 220. The available throughput may be degraded, relative to the maximum throughput, when a condition is associated with link 220. For example, the available throughput may decrease as a level of severity of the condition increases. The level of severity may increase as a quantity of packet delay increases, as a quantity of dropped and/or mis-ordered packets increases, etc.

As yet further shown in FIG. 6, process 600 may include identifying an achieved throughput, for each link, based on a prior achieved throughput and/or traffic that is available to be transmitted via each link (block 625). For example, PMP node 225 may retrieve, from a memory associated with PMP node 225, a value, associated with a quantity of prior achieved throughput (e.g., $PT_{(T-1)}$, from a prior period of time. PMP node 225 may communicate with PMP node 225 to identify a quantity of available traffic (e.g., $TX_T$) that is to be transmitted, via link 220 and to or from transport node 230 and/or micro base station 115, during a next available time period.

PMP node 225 may identify a quantity of achieved throughput (e.g., $AT'_T$) based on the value associated with the prior achieved throughput and/or another value associated with the quantity of available traffic. In one example, PMP node 225 may, in a manner similar to that described above with respect to FIG. 5, identify the quantity of achieved throughput based on an average of the value associated with the prior achieved throughput and/or another value associated with the quantity of available traffic (e.g., $AT'_T \cong (PT_{(T-1)} + TX_T)/2$). In another example implementation, PMP node 225 may retrieve, from the memory, a weighting factor (e.g., a, where $0 \le \alpha \le 1$) to be used to generate a weighted average of the value associated with the prior achieved throughput and/or another value associated with the quantity of available traffic (e.g., $AT'_T \cong (1-\alpha)*PT_{(T-1)} + \alpha*TX_T$).

As still further shown in FIG. 6, process 600 may include generating a priority for each link based on the achievable throughput and the achieved throughput (block 630). For example, PMP node 225 may generate a different priority value for each link 220 based on a respective achievable throughput and/or achieved throughput associated with each link 220. For example, PMP node 225 may generate a priority value (e.g., $P_T$), for link 220, based on the quantity of achievable throughput (e.g., $AT_T$) associated with link 220 and the quantity of achieved throughput (e.g., $AT'_T$) associated with link 220. In one example, PMP node 225 may generate the priority value by dividing the quantity of achievable throughput by the quantity of achieved throughput (e.g., $P_T = AT_T/AT'_T$).

For example, when performance of link 220 has been low (e.g., during a previous period of time), such as when the quantity of achieved throughput is less than a first threshold, the priority value may be high (e.g., greater than a second threshold). In another example, when performance of link 220 has not been low, such as when the quantity of achieved throughput is not less than the first threshold, the priority value may not be high (e.g., not greater than the second threshold). In yet another example, when the quantity of available throughput is low (e.g., less than a third threshold), such as when a condition, associated with link 220, exists, the priority value may not be high. In still another example, when the quantity of available throughput is not low (e.g., not less than the third threshold), such as when no condition, associated with link 220, exists, the priority value may be high. PMP node 225 may, in a manner similar to that described above, generate other priority values associated with other links 220.

As also shown in FIG. 6, process 600 may transmit traffic via a link to which the highest priority corresponds (block 635). For example, PMP node 225 may select a particular link 220 to which the highest priority value corresponds and may allocate resources to the selected link 220. For example, PMP node 225 may allocate a quantity of bandwidth to be used to transmit all or a portion of the quantity of available traffic via selected link 220. In another example, PMP node 225 may schedule a time slot associated with a period of time when the quantity of available traffic is to be transmitted via the selected link 220. In yet another example, PMP node 225 may allocate a frequency band to be used to transmit all or a portion of the quantity of available traffic via selected link 220. In still another example, PMP node 225 may identify a quantity of signal strength be used to transmit all or a portion of the quantity of available traffic via selected link 220. In another example implementation, PMP node 225 may select more than one link 220 over which to transmit available traffic. For example, PMP node 225 may select two or more links 220 over which to transmit available traffic based on two or more highest priority values associated with the selected two or more links 220. In another example, PMP node 225 may select one or more links 220 over which to transmit available traffic based on a determination that one or more priority values, associated with the selected one or more links 220, is greater than a threshold.

A system and/or method, described herein, may enable a PMP node, associated with a macro base station, to transmit traffic to and/or receive traffic from a transport node associated with a micro base station. The traffic may be transmitted via links that connect the PMP node and the transport node. The system and/or method may allow the PMP node to identify traffic conditions associated with each of the links. The system and/or method may allow the PMP node to identify an achievable throughput, for each of the links, that corresponds to a quantity of traffic that can be transmitted, via each of the links and within a period of time, based on the traffic conditions and/or a capacity associated with each of the links.

The system and/or method may allow the PMP node to identify an achieved throughput, for each of the links, that identifies a quantity of throughput associated with each of the links during a previous period of time. The systems and/or methods may allow the resource processor to assign a different priority to each of the links based on the achievable throughput and the achieved throughput for each of the links. The systems and/or methods may allow the PMP node to allocate resources to the link that has been assigned the highest priority which may allow the PMP node and/or the transport node to transmit traffic via the link that has been assigned the highest priority.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first node associated with a first base station, an instruction to transmit traffic via a particular link of a plurality of links that connect the first node to a plurality of second nodes associated with a plurality of second base stations;
   obtaining, by the first node and from the plurality of links, information associated with traffic conditions on the plurality of links;
   identifying, by the first node, quantities of achievable throughput, associated with the plurality of links during a first time period, based on throughput capacities associated with the plurality of links and the information associated with the traffic conditions;
   identifying, by the first node, quantities of achieved throughput, associated with the plurality of links, based on prior quantities of throughput associated with the plurality of links during one or more second time periods,
      each of the one or more second time periods preceding the first time period;
   generating, by the first node, a plurality of priority values, associated with the plurality of links, based on the quantities of achievable throughput and the quantities of achieved throughput;
   selecting, by the first node, a link, of the plurality of links, associated with a greatest priority value of the plurality of priority values; and
   transmitting, by the first node and to one of the plurality of second nodes via the selected link, traffic associated with the selected link.

2. The method of claim 1, where the information associated with the traffic conditions on the particular link includes at least one of:
   information associated with a quantity of bandwidth being used to transmit traffic via the particular link,
   information that identifies one or more frequency bands being used to transmit the traffic via the particular link,
   information that identifies a quantity of user devices being served via the particular link, or
   an indication whether a condition, associated with the traffic being transmitted via the particular link, has been detected.

3. The method of claim 1, where identifying the quantities of achievable throughput further includes:
   retrieving, from a memory associated with the first node, information associated with a throughput capacity that corresponds to the particular link, where the throughput capacity corresponds to a maximum quantity of bandwidth that can be transmitted via the particular link;
   determining that congestion exists on the particular link, based on the information associated with the traffic conditions; and
   identifying a quantity of achievable throughput, associated with the particular link, based on the maximum quantity of bandwidth and the congestion that exists on the particular link.

4. The method of claim 1, where identifying the quantities of achieved throughput further includes:
   retrieving, from a memory associated with the first node, another quantity of achieved throughput, from a second time period, of the one or more second time periods, associated with the particular link; and
   identifying a quantity of achieved throughput, associated with the particular link, based on the other quantity of achieved throughput from the second time period and a quantity of traffic that is available to be transmitted via the particular link.

5. The method of claim 4, where identifying the quantity of achieved throughput, associated with the particular link, further includes:
   generating a value corresponding to the quantity of achieved throughput based on an average or a median of the other quantity of achieved throughput from the second time period and the quantity of traffic that is available to be transmitted via the particular link.

6. The method of claim 4, where identifying the quantity of achieved throughput, associated with the particular link, further includes:
retrieving, from a memory associated with the first node, a weighting factor to be used to generate the quantity of achieved throughput; and
generating the quantity of achieved throughput based on a sum of:
a first quantity that corresponds to the other quantity of achieved throughput minus the weighting factor multiplied by the other quantity of achieved throughput, and
a second quantity that corresponds to the weighting factor multiplied by the quantity of traffic that is available to be transmitted via the particular link.

7. The method of claim 6, where setting the weighting factor to a first value causes the quantity of achieved throughput to be based on the other quantity of achieved throughput,
where setting the weighting factor to a second value causes the quantity of achieved throughput to be based on the quantity of traffic that is available to be transmitted, and
where setting the weighting factor to a third value causes the quantity of achieved throughput to be based on a portion of the other quantity of achieved throughput and another portion of the quantity of traffic that is available to be transmitted.

8. The method of claim 1, where generating the plurality of priority values further includes:
generating a priority value, of the plurality of priority values, associated with the particular link by dividing the quantity of achievable throughput, associated with the particular link, by the quantity of achieved throughput associated with the particular link.

9. The method of claim 1, further comprising:
ranking the plurality of priority values; and
identifying, as the greatest priority value, one of the plurality of priority values that is ranked higher than any other of the plurality of priority values.

10. A network device comprising:
one or more processors to:
receive an instruction to allocate resources to one of a plurality of links, to permit traffic to be transmitted to one of a plurality nodes, associated with a plurality of micro base stations, via the one of the plurality of links,
obtain information associated with traffic being transmitted, via the plurality of links, as a result of the instruction,
identify a respective quantity of achievable throughput, associated with each of the plurality of links during a first time period, based on a respective capacity of each of the plurality of links and a respective severity of a condition, associated with each of the plurality of links, obtained from the information associated with the traffic,
identify a respective quantity of achieved throughput, associated with each of the plurality of links, based on a respective quantity of achieved throughput associated with each of the plurality of links during a second time period that precedes the first time period and a respective quantity of traffic, that is available to be transmitted via each of the plurality of links during the first time period,
generate a respective priority value, associated with each of the plurality of links, based on the respective quantity of achievable throughput and the respective quantity of achieved throughput, and
transmit, to one of the plurality of nodes via a link of the plurality of links, a quantity of traffic, that is available to be transmitted via the link, based on a determination that a respective priority value, associated with the link, is greater than any other of the respective priority values.

11. The network device of claim 10, where the at least one of the one or more processors is further to:
determine that a condition is present on a particular link, of the plurality of links, when at least one of:
a quantity of bandwidth, associated with the particular link, is greater than a first threshold,
a quantity of signal power, associated with the particular link, is less than a second threshold,
a quantity of user devices, being served via the particular link, is greater than a third threshold, or
a quantity of dropped or mis-ordered packets, associated with traffic being transmitted via the particular link, is greater than a fourth threshold.

12. The network device of claim 10, where the network device or the plurality of nodes is associated with a backhaul network within a long term evolution (LTE) network.

13. The network device of claim 10, where a respective quantity of achievable throughput, associated with the link, is based on a maximum quantity of bandwidth, that can be used to transmit traffic, and a quantity of bandwidth as a result of a condition being present on the link.

14. The network device of claim 10, where the respective quantity of achieved throughput, associated with the link, represents an average of a quantity of bandwidth used to transmit traffic via the link during the second time period and a quantity of bandwidth to be used to transmit the traffic that is available to be transmitted via the link during the first time period.

15. The network device of claim 10, where the respective priority value increases when at least one of:
the quantity of the traffic, that is available to be transmitted via the link during the first time period, decreases,
a capacity, associated with the link during the first time period, increases, or
a level of severity, of a condition associated with the link during the first time period, decreases.

16. The network device of claim 10, where at least one of the one or more processors is further to:
determine that the respective priority value, associated with the link, is greater than any other of the respective priority values, and
allocate resources to the link based on the determination that the respective priority value is greater than any other of the respective priority values, where the resources include at least one of:
a quantity of bandwidth to be used to transmit a respective quantity of traffic that is available to be transmitted via the link during the first time period,
a frequency band to be used to transmit the respective quantity of traffic that is available to be transmitted via the link during the first time period, or
an indication of the first time period to be scheduled to transmit the respective quantity of traffic that is available to be transmitted via the link during the first time period.

17. A network device comprising:
one or more processors to:
receive an instruction to allocate resources to one or more of a plurality of links, to permit traffic to be transmitted to one or more of a plurality transport nodes, associated with one or more of a plurality of micro base stations, via the one or more of the plurality of links, determine traffic conditions, associated with the plurality of links, as a result of the instruction, identify a respective maximum throughput, associated with each of the plurality of links, based on a respective capacity of each of the plurality of links and a respective traffic condition associated with each of the plurality of links, identify a respective throughput, associated with each of the plurality of links, based on a respective quantity of traffic that is available to be transmitted via each of the plurality of links during a first time period and a respective throughput associated with each of the plurality of links during a second time period that occurs before the first time period, generate a respective priority value, associated with each of the plurality of links, based on the respective maximum throughput associated with each of the plurality of links and the respective throughput associated with each of the plurality of links, and transmit, to one or more of the plurality of transport nodes, traffic that is available to be transmitted, via one or more links, of the plurality of links, based on a determination that respective priority values, associated with the one or more links, are greater than a threshold.

18. The network device of claim 17, where, when identifying the respective maximum throughput, associated with each of the plurality of links, at least one of the one or more processors is further to:

retrieve, from a memory associated with the network device, information associated with a capacity that corresponds to a particular link, of the plurality of links, where the capacity corresponds to a maximum data rate that can be transmitted via the particular link, and identify that the respective maximum throughput, associated with the particular link, is less than the maximum data rate based on a determination that traffic conditions, associated with particular link, indicate that the particular link is congested.

19. The network device of claim 17, where, when identifying the respective throughput, associated with each of the plurality of links, at least one of the one or more processors is further to:

retrieve, from a memory associated with the network device, information that identifies a quantity of prior throughput, associated with a particular link of the plurality of links, during the second time period, and identify the respective throughput, associated with the particular link, based on the identified quantity of prior throughput and a quantity of traffic that is available to be transmitted via the particular link during the first time period.

20. The network device of claim 19, where, when identifying the respective throughput, associated with the particular link, at least one of the one or more processors is further to:

compute a quantity of throughput based on a weighted average of the quantity of prior throughput and the quantity of traffic that is available to be transmitted, via the particular link, during the first time period, where the weighted average is based on a sum of:

the quantity of prior throughput multiplied by a first weighting factor, and the quantity of traffic that is available to be transmitted, via the particular link, multiplied by a second weighting factor.

21. The network device of claim 17, where, when generating the respective priority value, at least one of the one or more processors is further to:

generate the respective priority value, associated with a particular link of the plurality of links, based on a quotient of a respective maximum throughput, associated with the particular link, divided by a throughput associated with the particular link.

22. The network device of claim 17, where, when transmitting the traffic that is available to be transmitted, at least one of the one or more processors is further to:

compare the respective priority value, associated with each of the plurality of links, to the threshold, determine that one or more priority values, associated with the one or more links, are greater than the threshold based on the comparison of the respective priority value, associated with each of the plurality of links, to the threshold, and allocate resources to the one or more links based on the determination that the one or more priority values are greater than the threshold, where allocating the resources includes:

a respective quantity of bandwidth that is assigned to each of the one or more links, or a respective set of frequency bands that is assigned to each of the one or more links.

* * * * *